United States Patent [19]

Kordesch

[11] 3,899,354

[45] Aug. 12, 1975

[54] GAS ELECTRODES AND A PROCESS FOR PRODUCING THEM

[75] Inventor: Karl V. Kordesch, Lakewood, Ohio

[73] Assignee: Union Carbide Corporation, New York, N.Y.

[22] Filed: Sept. 10, 1973

[21] Appl. No.: 395,552

[52] U.S. Cl. .......................... 136/86 D; 136/120 FC
[51] Int. Cl. ........................................... H01m 27/04
[58] Field of Search .......... 136/86 D, 86 R, 120 FC, 136/120, 122

[56] References Cited
UNITED STATES PATENTS

| | | | |
|---|---|---|---|
| 3,077,507 | 2/1963 | Kordesch et al. | 136/86 D |
| 3,322,576 | 5/1967 | Young | 136/122 |
| 3,477,877 | 11/1969 | Kordesch | 136/86 D |
| 3,553,029 | 1/1971 | Kordesch et al. | 136/86 D |
| 3,556,856 | 1/1971 | Elbert | 136/86 D |

*Primary Examiner*—John H. Mack
*Assistant Examiner*—H. A. Feeley
*Attorney, Agent, or Firm*—C. F. O'Brien

[57] ABSTRACT

A thin catalyzed gas electrode for fuel cells comprising a porous wet proofed conductive substrate having a first water-repellent porous active conductive layer over which is a surface-deposited noble metal catalyst in an amount of at least about 0.5 mg/cm$^2$, and a process for producing such an electrode.

12 Claims, No Drawings

GAS ELECTRODES AND A PROCESS FOR PRODUCING THEM

The invention described herein was made in the course of, or under Contract No. DAAK02-71-C-0297, with U.S. Army Mobility Equipment Research and Development Center, Fort Belvior, Virginia.

FIELD OF THE INVENTION

This invention relates to a thin catalyzed gas electrode particularly for use in fuel cells having aqueous acidic electrolytes, and a method for producing said electrode. The electrode comprises a porous wetproofed conductive substrate having a first water repellent porous active conductive layer over which is a second porous layer of a noble metal catalyst in an amount of at least about 0.5 mg/cm$^2$.

SUMMARY OF THE PRIOR ART

Many approaches exist for fabricating catalyzed electrodes for use in electrochemical cells. Electrodes employing highly active catalysts such as gold, silver and the six metals of the platinum group of the Periodic Table, have been employed, but the cost of these catalysts have proved too expensive for commercial exploitation. In French Pat. No. 1,591,308, there is described a method for producing a gas electrode having a conductive porous layer consisting of carbon particles onto which a catalyst has been deposited. Specifically, the catalyst-coated carbon particles are suspended in an appropriate liquid medium into which a polytetrafluorethylene (PTFE) emulsion is introduced. After homogenization, the mixture is deposited on a conductive substrate of the electrode by means of a pneumatic spray gun. The substrate with the porous layer of the water-repellent carbon mixture is then subjected to a heat treatment whereby the PTFE is sintered. Although this method produces a useful gas electrode, some cracks are produced in the porous layer containing the catalyst which are likely to have serious effects on performance of the electrode when used in a cell. To remedy this cracking problem, U.S. Pat. No. 3,695,936 disclosed the addition of a fibrous compound to the water-repellent carbon mixture so that during the heat treatment, the fibrous compound will serve as a binder during sintering thereby substantially avoiding the cracking of the porous layer. The dispersion of the catalyst material through the porous layer renders somewhat ineffective a portion of said material since it is not available on the surface of the electrode where it could be optimally used.

Although light weight, inexpensive gas electrodes can be made using mixtures of a catalyst and a hydrophobic polymer, such as PTFE, or a membrane of hydrophobic polymer adjacent to and in contact with the mixture of catalyst and hydrophobic polymer, several factors are critical in their production. The amount of catalyst loading must be high enough to obtain the desired voltage and current output and operating life of the fuel cell; the distribution of the catalytic mass should be as uniform as possible so that electrode performance characteristics can be predicted; and accurate control of the gas-liquid-solid reaction interface in the electrode must be maintained.

U.S. Pat. No. 3,688,014 discloses a gas electrode composed of a mat of polyfluorocarbon fibers having controlled pore size and hydrophobicity, impregnated with a catalytic substance. Again this type of electrode construction does not optimally utilize the catalytic substance since said substance is allowed to penetrate into the fiber mat.

U.S. Pat. No. 3,615,841 discloses another approach for producing light-weight gas electrodes by forming an admixture of electrochemically active metal and hydrophobic polymer in a fluid medium, depositing said admixture on a porous metal support and then after pressing said admixture into the metal support, heat-treating it to bond the polymer particles to each other and to the support. Again optimum use of the active metal is not obtained.

One of the primary objects of this invention is to provide a method for fabricating thin porous gas electrodes having a noble metal catalyst substantially only on the electrolyte surface of the electrode.

Another object of this invention is to provide a light-weight gas electrode having high performance characteristics while carrying a relatively low amount of a noble metal catalyst.

Another object of this invention is to provide a low-cost, light-weight gas electrode composed of a wetproofed conductive substrate, a first layer of a water-repellent porous active conductive material and a top thin surface layer of a noble metal catalyst, said noble metal catalyst being effectively and substantially available for use in electrochemical cells.

A further object of this invention is to provide a low-cost air electrode for medium temperature fuel cells having an immobilized phosphoric acid electrolyte.

SUMMARY OF THE INVENTION

This invention relates to a thin catalyzed gas electrode comprising a porous wetproofed conductive substrate having on one side (electrolyte side) a first water-repellent porous active conductive layer over which is a second layer of a noble metal catalyst in an amount of at least about 0.5 mg/cm$^2$, said noble metal substantially adhering to the surface of said first layer without essentially penetrating into the substrate. The water-repellent porous active conductive layer, which contacts the electrolyte, can range between about 0.002 inch (0.005 cm) and about 0.010 inch (0.0 54 cm) thick, and preferably be about 0.005 inch (0.0 27 cm) thick.

A method for producing a thin catalyzed gas electrode for fuel cells comprises the steps of:

a. preparing a thin porous conductive substrate;

b. wetproofing said substrate with a water-repellent compound;

c. depositing and curing a mixture of an active conductive material and a water-repellent agent onto one surface of said wetproofed substrate;

d. wetproofing said active conductive coated surface of the substrate with a hydrophobic material having a molecular weight lower than that of the water-repellent agent used in the mixture of step c) so as to wetproof the smaller pores of the active conductive layer; and e. catalyzing said wetproofed active conductive layer with a noble metal until a deposit of at least about 0.5 mg/cm$^2$ of the metal is achieved.

As used herein, water-repellent agent or compound shall mean a material that repels or which is not wetted by aqueous solutions, i.e., aqueous KOH or H$_3$PO$_4$ solutions.

As used herein, layer is intended to mean a zone wherein a major concentration of a particular material is located.

As used herein, carbon paper shall mean a sheet of fibrous carbon made by a paper making process.

As used herein, a thin porous conductive substrate shall mean a thin fibrous or porous sheet between about 3 mils (0.00762 cm) and about 15 mils (0.0381 cm) thick, preferably about 10 mils (0.0254 cm) thick, such as carbon paper, carbon cloth, carbon felt, carbon tape, and the like. Also, any porous metal screen, expanded metal, metal felt or mesh which is electrically conductive and able to withstand the corrosive environment of a fuel cell can be used. Examples of metal sheets suitable for use in this invention include nickel, iron, titanium, tantalum, zirconium, gold, silver and alloys thereof, depending on the choice of electrolyte.

A water-repellent compound for use in this invention can be selected from the group consisting of polytetrafluoroethylene, polyethylene, polytrifluorochlorethylene, polyvinylfluoride, polyvinylchloride, polyvinylidenefluoride, polyvinylidenechloride, neoprene, styrene-butadiene copolymer, natural waxes, or equivalent thereof. However, due to its exceptional hydrophobicity and its resistance to heat and the corrosive environment of electrolytes such as phosphoric acid, polytetrafluoroethylene is preferred.

An active conductive material for use in this invention can be a gas-activated carbon of organic origin (sugar, wood pitch, etc.) or a carbon obtained by steam-activating organic substances such as phenolic resins, etc., which are used as binders for other carbon materials; e.g. lampblack. One example of an active conductive material is a graphitic carbon obtained as a by-product in the manufacture of calcium cyanamide from the reaction of calcium carbide and nitrogen at temperatures in excess of 1000°C. Carbon, not active to start with, can also be subjected to steam or $CO_2$ activation at temperatures above about 800°C. in the presence of a spinel catalyst, e.g., $Al_2O_3 \cdot CoO$, so as to accelerate the development of active carbon on a substrate. In general, reactions in which carbon is produced by nucleation in a high temperature liquid state process may be employed to recover carbon suitable for use as the active material in the wetproofed porous conductive substrate of the invention.

The active conductive material has to be mixed with an aqueous emulsion of a water-repellent agent to produce an aqueous suspension which can then be applied to the substrate by spraying, painting, rolling, dipping or some other similar technique. The water-repellent agent can be selected from the group of water-repellent compounds listed above. Preferably the active material can be mixed with a water-repellent suspension such as an aqueous polytetrafluoroethylene suspension, wherein the active carbon material is present in an amount between about 85% and about 45% by weight of the mixture, preferably about 75% by weight, and the water-repellent agent, including the suspension medium, is present in an amount between about 15% and about 55% by weight of the mixture, preferably about 25% by weight. The mixture should be deposited on the substrate until an active layer between about 2 mils (0.005 cm) and about 10 mils (0.0254 cm) is achieved, preferably about 5 mils (0.0127 cm).

Hydrophobic materials for use in this invention include paraffin dissolved in petroleum ether, kerosene or trichlorethylene; or cellulose acetate dissolved in acetone, methyl isopropyl ketone (MIK), methyl ethyl ketone (MEK), or other ketones.

When using a fluorinated hydrocarbon agent as the water-repellent agent in the active material mixture, the hydrophobic material selected should not attach said agent or be water soluble. In addition, the hydrophobic material has to have a lower molecular weight than the water-repellent agent so that it can wetproof the smaller pores on the active carbon deposited surface which are usually in the order of about 50 A. Water-repellent agents, such as polytetrafluoroethylene, usually have molecule aggregates 10 to 100 times larger than such small pores and thus could not effectively wetproof these pores. If these small pores (in the order of 50 A) are not made water-repellent, they will act as strong capillaries with a high negative pressure (draw water in) which would result in some of the metal salt solution penetrating through the active carbon layer into the substrate. This will result in some of the noble metal penetrating into the substrate of the electrode thereby reducing the metal concentration at the surface of the electrode. Thus in the prior art it was necessary to deposit large amounts of a noble metal to insure that a sufficient amount of said noble metal was concentrated on the surface of the electrode so that it would be available at the reaction interface of the electrode when said electrode is operating in an assembled fuel cell. On the other hand, if these smaller pores are made water-repellent in accordance with this invention, they will act in an opposite way so that they will resist water penetration with a large expulsion force. This wetproofing of the smaller pores on the surface of the active layer of the electrode will produce a penetration barrier which is essential for optimizing the concentration of the noble metal on said surface so that electrodes can be produced with a surface layer of said metal catalyst in an amount of at least about 0.5 $mg/cm^2$ and which can perform with the same load characteristics in fuel cell applications as similar type electrodes using 3 to 20 times that amount of noble metal. Preferably a surface layer of said metal catalyst should be present in an amount between about 0.5 and about 2.0 mg/cm.

It may be preferable to utilize a fugitive or temporary type of hydrophobic material which can be removed after the noble metal catalyst has been deposited. An example of a fugitive or removable type repellent is cellulose acetate which can be put on the active material layer as a solution in acetone, e.g., 1 to 5 weight per cent cellulose acetate in the solution, preferably 1.5 to 2 weight per cent cellulose acetate in the solution. The solvent upon evaporating will leave a cellulose acetate barrier which will prevent the penetration of the noble metal salt solution into the substrate of the electrode during the deposition of the metal thereby forcing said noble metal catalyst to be deposited on the carbon surface so that it will be near the interface of the electrode when said electrode is operating in an assembled cell. After the deposition of the metal catalyst, the cellulose acetate can be removed with acetone or similar liquid leaving the metal catalyst confined to the surface of the wetproofed electrode. Thus there will be no barrier layer remaining on the finished electrode which could possibly block the diffusion of gas through the reaction interface of the electrode in an operating cell.

The noble metals for use in this invention include the platinum family metals from Group VIII of the Mendeleev Periodic Table, i.e., rhodium, ruthenium, palladium, osmium, iridium and platinum, silver, gold and mixtures and alloys thereof. Of these, platinum is preferably since it is especially active and also since it is chemically inert in acid electrolytes. Silver, on the other hand, can be used only in alkaline electrolytes.

The catalytic metal can be deposited onto the surface of the electrode by using any conventional technique. For example, an aqueous solution of a noble metal salt, e.g., about 10 percent by weight metal, can be mixed with an equal amount of a diluent such as isopropyl alcohol (which also serves temporarily as a wetting agent for the wetproofed substrate), and then applied on the wetproofed active material surface of the electrode by painting, spraying or similar techniques. After the required amount of the metal salt is deposited, the electrode can be sufficiently heated to completely remove the water and decompose the metal salt, thereby leaving a surface layer of the metal on the electrode. When the noble metal salt is platinum chloride, then the electrode may be submerged in a 1 to 2 percent solution of $KBH_4$ in water to reduce the platinum salt and remove the remaining chloride, or the platinum salt may be reduced with $H_2$ gas. Thereafter the electrode is dried and ready for use. If a fugitive barrier is employed, it should be removed at this time. Since the carbon electrode is subject to oxidation when heated above about 150°C., any such heat treatment should be performed in an inert atmosphere such as nitrogen. Electrodes suitable for most cell applications should have a thickness between about 5 mils (0.0127 cm) and 25 mils (0.0635 cm), preferably between about 10 mils (0.0254 cm) and about 20 mils (0.05080 cm).

Air electrodes which are well suited for use in acid electrolyte fuel cells can be fabricated using the teachings of this invention. The choice of materials for such air electrodes is somewhat limited, however, due to the severe corrosive characteristics of acidic electrolytes, such as phosphoric acid. Furthermore, in order to diminish the kinetic limitations and to improve electrolyte conductivity, these acid electrolyte fuel cells have to be operated at elevated temperatures which unfortunately increases the corrosive characteristics of the electrolyte. The following illustration will serve to show some materials that can be used in making air electrodes for acid electrolyte fuel cells.

A suitable fibrous or porous conductive substrate for a gas electrode is a carbon, both graphitic and non-graphitic, flexible sheet, such as paper, cloth or tape. The carbon substrate should be between about 3 mils (0.00762 cm) and about 15 mils (0.0381 cm) thick, preferably about 10 mils (0.0254 cm). A substrate thinner than 3 mils (0.00762 cm) would be unacceptable because of reduced mechanical strength, while a substrate thicker than 15 mils (0.0381 cm) would not be needed. The carbon substrate can also be impregnated with a suitable resin, such as phenolic resins, polysulfone, or methacrylic resins, so as to impart rigidity and strength to the substrate at least temporarily during manufacturing. The selected carbon substrate is then wetproofed with a water-repellent material as described above. Preferably, an aqueous polytetrafluoroethylene (PTFE) suspension containing between about 15 and about 60 weight per cent PTFE, can be sprayed or otherwise applied to the porous carbon substrate. The coated carbon substrate is thereafter cured at an elevated temperature between about 300°C. and about 350°C. for a time sufficient to cause sintering of the plastic.

The active carbon required as the surface coating for the carbon substrate can be gas-activated (by steam or $CO_2$) carbon of organic origin or carbon obtained by steam-activating organic substances such as phenolic resins and the like. To accelerate the development of the carbon surface, the active carbon can be subjected to steam or $CO_2$ activation at a temperature above about 800°C. in the presence of a spinel catalyst such as $Al_2O_3 \cdot CoO$. The active carbon, so prepared and treated, is then mixed with an aqueous PTFE suspension, said aqueous suspension containing between about 15 and about 60 weight percent PTFE. The active carbon in the mixture should be between about 45 and about 85 weight percent of the PTFE suspension. The mixture is then sprayed or otherwise applied to one surface of the wetproofed carbon substrate until a layer of between about 2 mils (0.005 cm) and about 10 mils (0.0254 cm) thick is achieved. Depending on the concentration of the active carbon in the mixture, the deposited layer may vary from the above range if an overall deposit of active carbon of between about 1 and about 3 mg/cm$^2$ is desired. The active carbon water-repellent coated porous substrate can then be subjected to a pressing or rolling treatment if it is advantageous to have an extremely smooth surface. The catalyst application, which would normally be performed at this stage of the procedure, is postponed, since the smaller pores of the active carbon layer would not be wetproofed because the PTFE molecule aggregates may be 10 to 100 times larger than such pores. As stated above, if these small pores are not made water-repellent, they will act as strong capillaries with a high negative pressure which would result in some of the metal salt solution penetrating through the active carbon layer into the substrate. Thus an additional wetproofing procedure is necessary to provide a penetration barrier on the active carbon layer which will insure that the smaller pores are wetproofed so that they will strongly resist water penetration thereby insuring that the noble metal will stay essentially on the surface of the electrode where it can be optimally utilized.

This penetration barrier material has to have a lower molecular weight than the water-repellent agent used in the active carbon mixture, be substantially non-reactive with said water-repellent agent, and have hydrophobic properties. With PTFE as the water-repellent agent, then a suitable barrier material can be paraffin dissolved in petroleum ether or kerosene wherein the weight percent of paraffin is between about 1 percent and about 3 percent, preferably about 1.5 percent; or cellulose acetate in solution with acetone wherein the weight percent of cellulose acetate is between about 1.0 percent and about 5.0 percent, preferably about 1.5 to 2.0 percent. The use of paraffin as the penetration barrier will effectively provide a permanent penetration barrier on the electrode since once it is applied and the liquid suspending vehicle of petroleum ether or kerosene is removed, the paraffin will permanently remain on the electrode even after the noble metal catalyst is applied. The use of cellulose acetate as the penetration barrier will effectively provide a temporary or fugitive barrier which can be removed after the catalyzing step has been completed. Specifically, the cellulose acetate solution can be deposited onto the active carbon surface by conventional techniques and then the solvent, acetone, can be evaporated leaving a cellulose acetate barrier. After the catalyzing step is completed, whereupon a surface of active metal is formed on the electrode, acetone or its equivalent can be used to remove the cellulose acetate film thereby leaving the catalyst on the surface of the electrode. This fugitive type of penetration barrier is preferably because it can be substantially removed thereby yielding a finished electrode having no barrier material which could partially block gas diffusion through the electrode when said electrode is operating in an assembled fuel cell.

Platinum is preferred as the noble metal for use in acidic electrolyte fuel cells because of its resistance to corrosion. An aqueous solution of a platinum salt, such as platinum chloride, wherein the weight per cent of platinum can vary between about 5 per cent and about 20 percent of this solution, preferably about 10 percent, can be mixed with a diluent and temporary wetting agent, such as isopropyl alcohol or the like, in a ratio of between about 1:1 and about 1:6, preferably about 1:3. The mixture can then be applied on one side of the wetproofed electrode (electrolyte side) by conventional techniques until a desired amount of platinum salt is deposited which will yield a surface layer of at least about 0.5 mg of platinum per square centimeter on the finished electrode and preferably between about 0.5 and 2.0 mgs of platinum per square centimeter. To expedite the removal of the water and/or solvent and to decompose the metal salt to form the metal catalyst, the electrode can be heated to about 150°C., preferably in an inert atmosphere, such as nitrogen, to prevent carbon oxidation. An alternate procedure would be to submerge the electrode in a 1 to 2 percent solution of $KBH_4$ in water so as to reduce the platinum salt and remove the remaining chloride. Similarly, hydrogen gas may be employed to reduce the platinum salt. Whichever procedure is utilized, the electrode upon being dried and when necessary, the fugitive barrier removed, will then be ready for use in a fuel cell, i.e., a fuel cell having an acidic electrolyte such as phosphoric acid.

Although the above illustration is directed to a gas cathode for use in fuel cells operating with acidic electrolytes, such as phosphoric acid, it is possible to employ the electrode of this invention in other electrochemical devices.

EXAMPLE 1

A number of platinized gas electrodes were fabricated in the following manner. Carbon paper, Grade VDL as supplied by Union Carbide Corporation, measuring 6 inches (15.24 cm) by 6 inches (15.24 cm) by 14 mils (0.0356 cm) thick, was sprayed with an aqueous polytetrafluoroethylene suspension containing 55 weight percent polytetrafluoroethylene, until the carbon paper was saturated. Thereafter the carbon paper was cured by heating to 325°C. in a nitrogen atmosphere for 30 minutes.

A mixture of polytetrafluoroethylene suspension (25 weight percent polytetrafluoroethylene) and "Vulcan" carbon type XC-72R (an activated carbon commercially obtained from Cabot Chemical Company) was sprayed onto the wetproofed carbon substrate until an active carbon deposited layer about 0.005 inch (0.125 cm) thick was obtained. The active carbon coated substrate was then cured by subjecting it to a heat treatment of 325°C. for 30 minutes. Thereafter, the active coated substrate was pressed so as to densify and cohere the coated layer on the substrate while also providing a relatively smooth surface.

The active carbon-coated substrate was then treated with a solution of 1.5 weight percent paraffin dissolved in petroleum ether and brought to a temperature of 50°C. for 30 minutes. This effectively wetproofed the smaller pores in the active layer.

An aqueous solution of platinum chloride (10 weight percent platinum) mixed with an equal amount of isopropyl alcohol was painted on the wet-proofed active carbon-coated substrate to provide 1 to 2 milligrams of platinum per square centimeter on the active carbon surface. The painted substrate was heated in a nitrogen atmosphere at a temperature of 150°C. for 30 minutes to effect thermal decomposition of the platinum salt and then the substrate was submerged in a 1 percent solution of $KBH_4$ in water to insure reduction of the platinum salt and remove the remaining chloride. After drying, the electrode produced was ready for use in a phosphoric acid cell. Several such electrodes having different amounts of platinum were incorporated into 3 inch (7.62 cm) by 3 inch (7.62 cm) fuel cells having an immobilized 95 per cent phosphoric acid electrolyte. The fuel cells each had a tantala (tantalum oxide) matrix separator sandwiched between the anode and the cathode with the catalyzed active side of the electrode in contact with the electrolyte-containing matrix thereby establishing a gas-electrolyte-active carbon interface.

The fuel cells were operated at 80 mA/cm$^2$ using $H_2$ as the fuel and air as the oxidant. The cell voltages were measured using the different electrodes fabricated in accordance with this invention. Table I shows the results of the voltage measurements after different time periods for an air electrode having 1.5 mg Pt/cm$^2$, while Table II shows the voltage measurements for various current densities of a similar air electrode.

Table I

| Current Density | *Resistance-Free Voltage (Volts) | Terminal Voltage (Volts) | Time (Hours) |
|---|---|---|---|
| 80 mA/cm | 0.68 | 0.57 | 0 |
|  | 0.65 | 0.54 | 500 |
|  | 0.65 | 0.54 | 1000 |
|  | 0.64 | 0.53 | 1500 |
|  | 0.63 | 0.54 | 2000 |
|  | 0.62 | 0.52 | 3000 |
|  | 0.62 | 0.51 | 5000 |
|  | 0.61 | 0.54 | 6000 |
|  | 0.59 | 0.53 | 7000 |
|  | 0.58 | 0.52 | 8000 |

Table II

| Current Density (mA/cm$^2$) | *Resistance Free Voltage (Volts) | Terminal Voltage (Volts) |
|---|---|---|
| 25 | 0.75 | 0.72 |
| 50 | 0.71 | 0.63 |
| 80 | 0.68 | 0.58 |
| 100 | 0.66 | 0.52 |
| 125 | 0.63 | 0.48 |
| 150 | 0.61 | 0.42 |

*Resistance-free voltage is the terminal voltage corrected for the voltage drop across the ohmic resistance of the electrolyte.

As demonstrated by the above tests, fuel cells employing air and hydrogen gas electrodes with as little as 1.5 mg Pt/cm$^2$ in accordance with this invention can operate continuously at a terminal voltage of above 0.50 volt at 80 mA/cm$^2$ for over 8000 hours. To obtain the same operating characteristics from prior art commercial gas electrodes catalyzed in depth would require at least 4 mg Pt/cm$^2$.

An electrode was fabricated as described above but without the additional step for wetproofing the smaller pores of the active carbon surface. With 1.8 mg Pt/cm$^2$ on the electrode, and using the fuel cell test as described above, the fuel cell voltage fell below 0.50 volt in only 170 hours.

EXAMPLE II

Platinized gas electrodes were fabricated as described above except that the active coated substrates were painted with a fugitive coating instead of the paraffin solution. The fugitive coating, consisting of a 2.0 weight percent cellulose acetate solution in acetone, was painted on the active carbon surface. The solvent was then evaporated leaving a cellulose acetate barrier on the surface. The platinum salt was then applied and treated as described above to form the active metallic platinum catalyst. The cellulose acetate barrier was then removed with acetone, leaving the catalyst on the surface of the electrode. Using the type of fuel cell described in Example I, the electrodes were tested and the average voltage and current density measurements for the electrodes are shown in Table III.

Table III

| Air Electrode (Platinum/cm$^2$) | Resistance-Free Voltage (Volts) | Terminal Voltage (Volts) | Current Density mA/cm$^2$ |
|---|---|---|---|
| 1.5 mg/cm$^2$ | 0.94 | 0.94 | 0 |
|  | 0.73 | 0.71 | 50 |
|  | 0.66 | 0.61 | 100 |
|  | 0.59 | 0.51 | 150 |

Thus it is demonstrated that using the teachings of this invention, gas electrodes can be produced with a minimum amount of an active metallic catalyst material while having performance characteristics equal or better to prior art gas electrodes having several times the amount of the active metallic catalyst material.

The electrodes of this invention can be used in a variety of electrochemical cells, such as fuel cells and metal-air cells, operable at various temperatures and with various electrolytes. Among the suitable electrolytes are alkali metal hydroxides, alkanolamines, sulfuric acid, phosphoric acid and any other suitable electrolyte material which will provide sufficient ionic conductivity. The electrodes of this invention can be effectively used as either cathodes or anodes in a fuel cell.

As will be apparent to one skilled in the art, the illustrative examples are only set forth as preferred embodiments of the invention and it is therefore possible to produce other embodiments and modifications of the invention without departing from the scope or spirit of the appended claims.

What is claimed is:

1. A thin catalyzed gas electrode comprising a porous wetproofed conductive substrate having a first water-repellent porous active conductive layer over which is a second layer of a noble metal catalyst in an amount at least about 0.5 mg/cm$^2$, said noble metal substantially disposed on the surface of the wetproofed porous active conductive layer with effectively no penetration of said noble metal into the smaller pores of the active conductive layer, said pores being in the order of about 50A; said thin electrode having an overall thickness between about 0.005 and about 0.025 inch; and said water-repellent porous active conductive layer containing an active material dispersed in a water-repellent agent such that the active material is present in an amount at least about 45% by weight of the water-repellent porous active conductive layer.

2. The gas electrode of claim 1 wherein said substrate comprises a material selected from the group consisting of carbon paper, carbon cloth, carbon tape, carbon felt, metal screen, expanded metal, metal mesh and metal felt; wherein said porous conductive first layer comprises activated carbon and a material selected from the group consisting of polytetrafluoroethylene, polyethylene, polytrifluorochloroethylene, polyvinylfluoride, polyvinylchloride, polyvinylidenefluoride, polyvinylidenechloride neoprene, styrene-butadiene copolymer and natural waxes; and wherein said noble metal is selected from the group consisting of platinum, rhodium, ruthenium, palladium, osmium, iridium, silver, gold and mixtures and alloys thereof.

3. The gas electrode of claim 1 wherein said substrate and said porous active conductive first layer contains a water-repellent material selected from the group consisting of polytetrafluoroethylene, polyethylene, polytrifluorochlorethylene, polyvinylfluoride, polyvinylchloride, polyvinylidenefluoride, polyvinylidenechloride, neoprene, styrene-butadiene copolymer and natural waxes.

4. The gas electrode of claim 3 wherein said porous conductive first layer contains paraffin.

5. The gas electrode of claaim 1 wherein said water-repellent porous active conductive layer is between about 0.002 and about 0.010 inch thick.

6. The gas electrode of claim 5 wherein said porous wetproofed conductive substance is about between about 0.003 and about 0.015 inch thick.

7. The gas electrode of claim 1 for use with immobilized phosphoric acid fuel cells wherein said porous wetproofed conductive substrate is carbon paper coated with polytetrafluoroethylene; said water-repellent porous active conductive layer is activated carbon and polytetrafluoroethylene; and said noble metal is platinum.

8. A method for producing a thin catalyzed gas electrode for fuel cells comprising the steps:

a. preparing a thin porous conductive substrate;

b. wetproofing said substrate with a water-repellent compound;

c. depositing and curing a mixture of an active conductive material and a water-repellent agent on one surface of said wetproofed substrate to produce a water-repellent porous active-conductive layer on said substrate;

d. wetproofing said water-repellent porous active conductive coated substrate with a hydrophobic material having a molecular weight lower than that of the water-repellent agent used in the mixture of step (c) so as to wetproof the smaller pores of the water-repellent porous active conductive layer; said wetproofing step comprising the deposit of a hydrophobic material in solution or in a liquid suspending vehicle onto the water-repellent porous active conductive layer followed by the removal of the solvent or the liquid suspending vehicle leaving the hydrophobic material on said layer; and e. catalyzing said wetproofed active conductive layer containing the hydrophobic material with a noble metal until a deposit of at least about 0.5 mg/cm$^2$ of the noble metal is achieved.

9. The method of claim 8 wherein said hydrophobic material is cellulose acetate and whereby after step (e) the following step is added:

f. dissolving out the deposited cellulose acetate by dissolving said cellulose acetate with a material which is non-reactant to both the active conductive material and the noble metal.

10. The method of claim 9 wherein in step (f) acetone is used to dissolve out the deposited cellulose acetate.

11. The method claim 8 wherein said porous conductive substrate is selected from the group consisting of carbon paper, carbon cloth, carbon felt, carbon tape, metal mesh, screen, felt and expanded metal; wherein said water-repellent compound and said water-repellent agent are selected from the group consisting of polytetrafluoroethylene, polyethylene, polytrifluorochloroethylene, polyvinylfluoride, polyvinylchloride, polyvinylidenefluoride, polyvinylidenechloride, neoprene, styrene-butadiene copolymer and natural waxes; and wherein said hydrophobic material is selected from the group consisting of paraffin dissolved in a material selected from the group consisting of petroleum ether, kerosene and trichlorethylene, and cellulose acetate dissolved in a material selected from the group consisting of acetone, methyl isopropyl ketone, and methyl ethyl ketone; and wherein said noble metal is selected from the group consisting of platinum, palladium, rhodium, iridium, ruthenium, osmium, silver, gold and mixtures and alloys thereof.

12. The method of claim 10 wherein said porous conductive substrate is carbon paper having a thickness between about 0.003 and about 0.015 inch; said water-repellent compound is polytetrafluoroethylene, said active conductive material is activated carbon; said water-repellent agent is polytetrafluoroethylene; said hydrophobic material is cellulose acetate dissolved in acetone; and said noble metal is platinum.

* * * * *

UNITED STATES PATENT OFFICE
CERTIFICATE OF CORRECTION

Patent No. 3,899,354              Dated August 12, 1975

Inventor(s) K. V. Kordesch

It is certified that error appears in the above-identified patent and that said Letters Patent are hereby corrected as shown below:

Column 2, line 45, "(0.0254" (type not visible) should read -- (0.0254 --.

Column 2, line 46, "(0.0127" (type not visible) should read -- (0.0127 --.

Column 4, line 6, "attach" should read -- attack --.

Column 4, line 15, "small" should read -- smaller --.

Column 10, line 38, "claaim" should read -- claim --.

Column 11, line 20, after the word "method" the word -- of -- has been omitted.

Signed and Sealed this twenty-third Day of March 1976

[SEAL]

Attest:

RUTH C. MASON
Attesting Officer

C. MARSHALL DANN
Commissioner of Patents and Trademarks